United States Patent
Shiotani et al.

(10) Patent No.: US 6,739,540 B2
(45) Date of Patent: May 25, 2004

(54) SEAT BELT RETRACTOR

(75) Inventors: Masahiro Shiotani, Tokyo (JP); Joji Mishina, Tokyo (JP); Yasushi Kanamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/912,261

(22) Filed: Jul. 25, 2001

(65) Prior Publication Data

US 2002/0014550 A1 Feb. 7, 2002

(30) Foreign Application Priority Data

Jul. 25, 2000 (JP) ........................... 2000-223999

(51) Int. Cl.[7] .................. B60R 22/46; B25G 3/28; F16H 55/17
(52) U.S. Cl. ................... 242/374; 74/437; 74/451; 403/359.1; 403/359.6
(58) Field of Search .............. 242/374, 379.1, 242/382–384.7; 74/431, 433, 437, 438, 439, 446, 447, 451, 462; 403/359.1–359.6; 29/893.1

(56) References Cited

U.S. PATENT DOCUMENTS

| | | | | |
|---|---|---|---|---|
| 1,697,470 A | * | 1/1929 | Nourse | .................... 74/447 X |
| 2,634,991 A | | 4/1953 | Stevens | |
| 4,187,925 A | * | 2/1980 | Lindblad | ................ 242/374 X |
| 4,444,010 A | | 4/1984 | Bendler | ........................ 60/407 |
| 4,509,381 A | * | 4/1985 | Ikemoto et al. | ............... 74/413 |
| 4,987,330 A | * | 1/1991 | Murphy et al. | .......... 403/359.1 |
| 5,098,030 A | * | 3/1992 | Kosugi | ....................... 242/374 |
| 5,326,042 A | | 7/1994 | Nishizawa et al. | |
| 5,666,854 A | * | 9/1997 | Buri et al. | ................. 74/439 X |
| 5,690,295 A | | 11/1997 | Steinberg et al. | .......... 242/374 |
| 5,716,156 A | * | 2/1998 | Bayer et al. | ............. 403/359.6 |
| 5,799,558 A | * | 9/1998 | Hewitt et al. | |
| 5,853,135 A | * | 12/1998 | Dybro et al. | ............... 242/374 |
| 5,881,962 A | | 3/1999 | Schmidt et al. | ............. 242/374 |
| 6,224,008 B1 | * | 5/2001 | Smithson et al. | ........... 242/374 |
| 6,299,091 B1 | * | 10/2001 | Blackadder et al. | . 242/379.1 X |
| 6,336,606 B1 | * | 1/2002 | Smithson et al. | .... 242/379.1 X |
| 6,360,980 B1 | * | 3/2002 | Lee | .......................... 242/379.1 |
| 6,405,959 B1 | * | 6/2002 | Klingauf et al. | ............ 242/374 |
| 6,419,176 B1 | * | 7/2002 | Mizuno | ...................... 242/374 |
| 6,604,885 B1 | * | 8/2003 | Neuner | .................... 403/359.2 |
| 2001/0035472 A1 | * | 4/2001 | Hamaue et al. | ............. 242/374 |

FOREIGN PATENT DOCUMENTS

| | | |
|---|---|---|
| DE | 42 42 782 A1 | 7/1993 |
| DE | 195 12 660 | 10/1995 |
| DE | 299 08 598 U1 | 9/1999 |
| DE | 200 03 453 U1 | 7/2000 |
| DE | 199 09 938 | 8/2000 |
| DE | 100 08 824 | 9/2000 |
| EP | 0 680 856 | 3/1995 |
| FR | 80.832 | 10/1963 |
| GB | 2347 124 | 8/2000 |
| JP | 2001-63519 | 3/2001 |
| JP | 2001-063520 | 3/2001 |
| WO | WO 95/27638 | 10/1995 |
| WO | WO 96/25310 | 8/1996 |

* cited by examiner

Primary Examiner—John M. Jillions
(74) Attorney, Agent, or Firm—Foley & Lardner LLP

(57) ABSTRACT

A seat belt retractor having a structure preventing a gear or pinion having external teeth from being improperly assembled to a spool gear. The pinion includes concave portions on its inner periphery and the spool gear includes corresponding convex portions on its outer periphery. The concave and convex portions are configured to be fit together may be inclined in the circumferential direction and thus have no symmetrical plane. If during assembly the pinion is positioned adjacent the spool gear with the wrong side out, the pinion and the spool gear would not fit together and the mistake would be noticed and, therefore, prevented.

2 Claims, 4 Drawing Sheets

Fig 1
(a1)
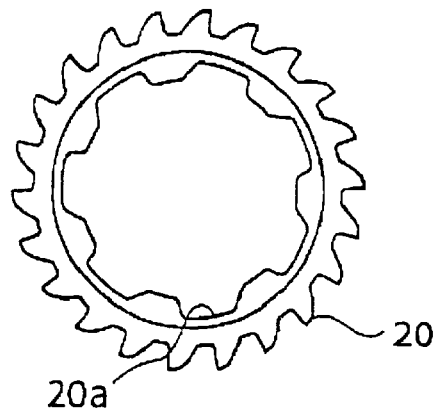
20a 20
(a2)
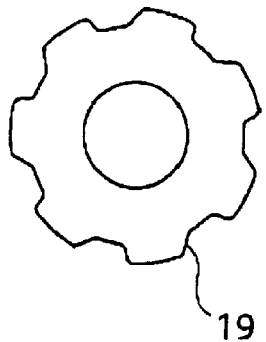
19
(b1)
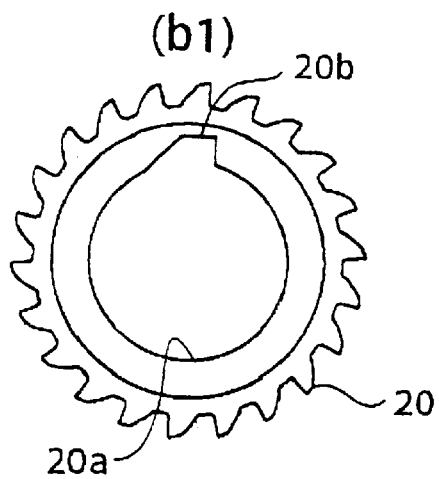
20b
20
20a
(b2)
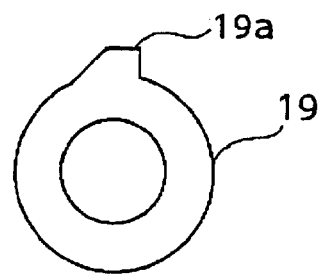
19a
19
(c1)
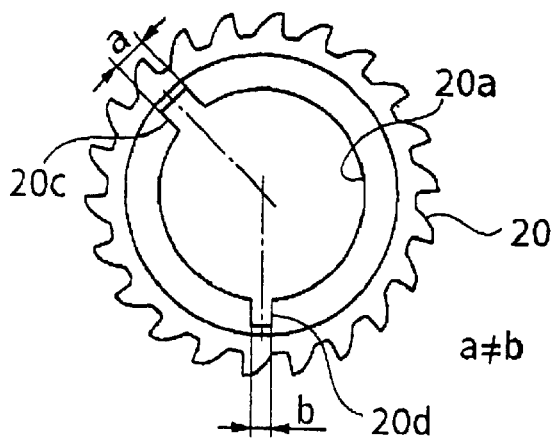
20c 20a 20
a≠b
20d b
(c2)
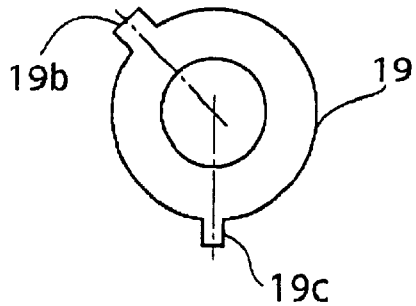
19b 19
19c

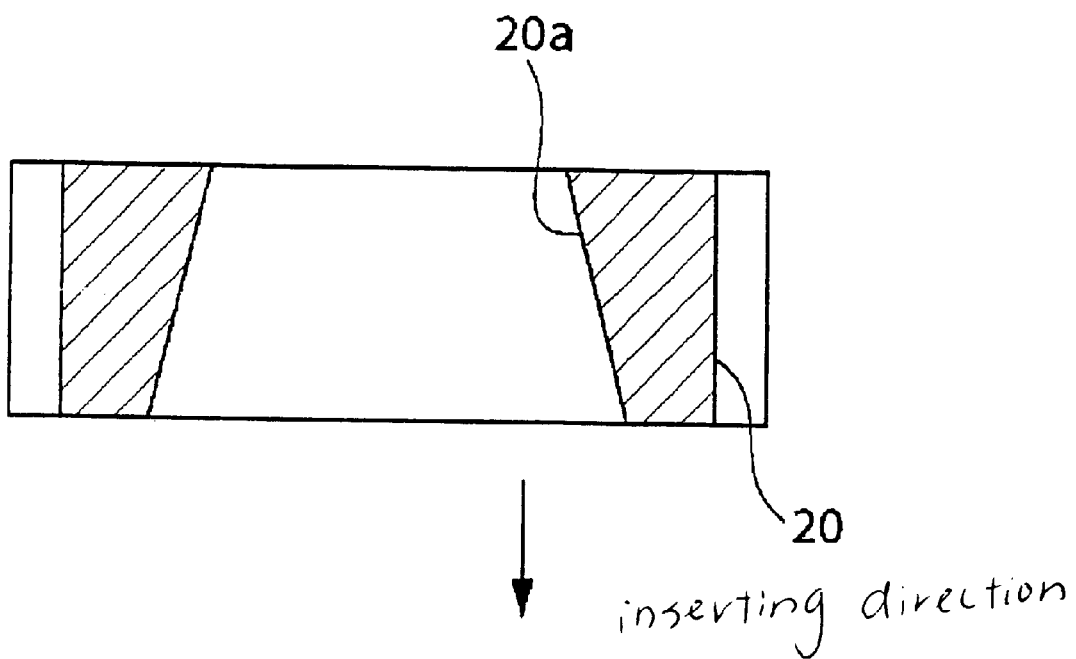

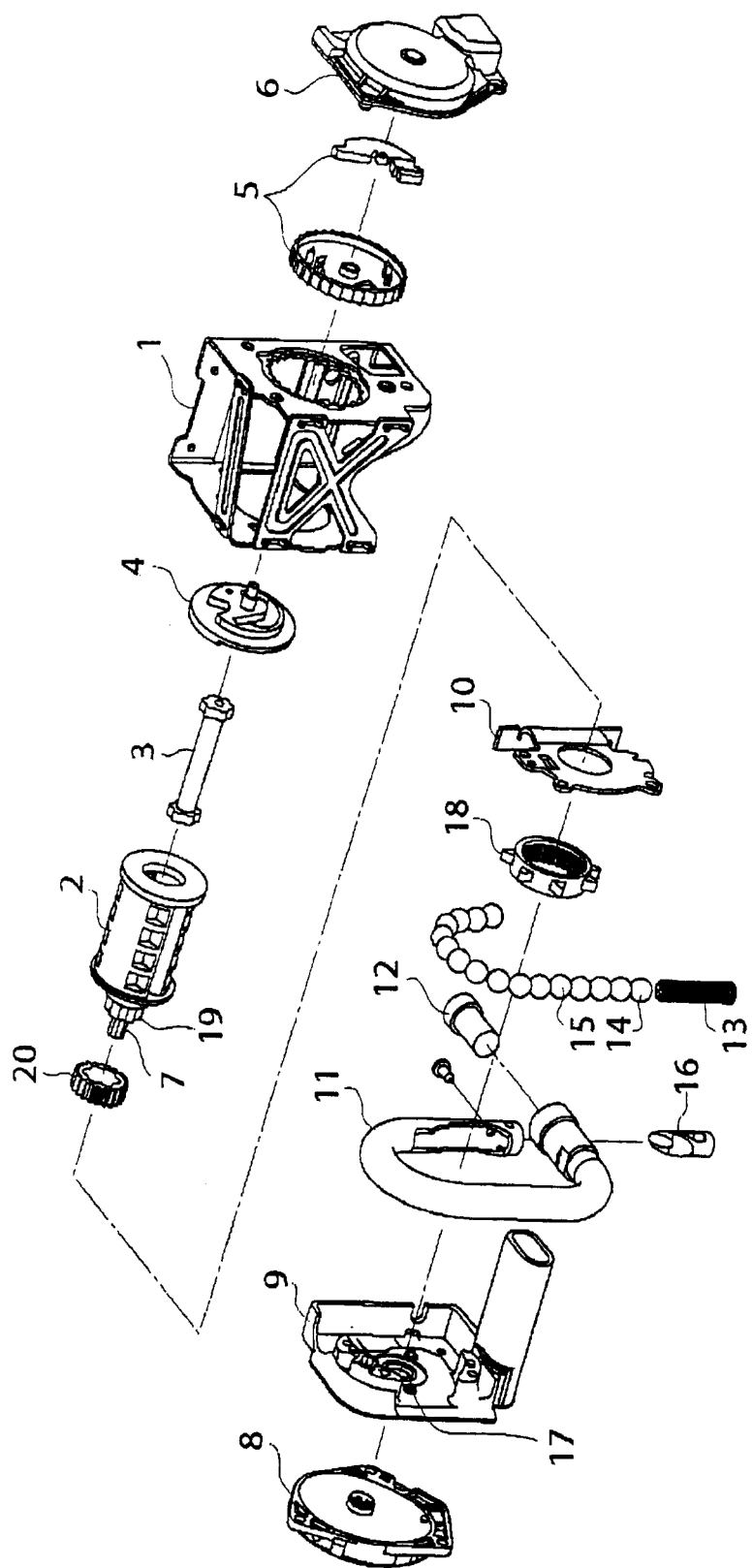

*PRIOR ART*

*PRIOR ART*

SEAT BELT RETRACTOR

BACKGROUND OF THE INVENTION

The present invention relates to a seat belt retractor for winding up a seat belt onto a rotational spool.

A passenger car is normally equipped with seat belts for protecting occupants when the car experiences an abrupt deceleration. Such a seat belt device may include a pretensioner which takes up a predetermined amount of seat belt around an occupant in order to restrain the occupant with increased force when an accident such as a vehicle collision is detected.

Currently, there are various types of pretensioners in use. One known type of pretensioner includes a pipe, a gas generator disposed on one end of the pipe, a piston arranged in the pipe, and balls arranged in the pipe. The balls are moved via the piston by gas pressure produced by the gas generator and are discharged through an outlet disposed at the other end of the pipe. A pretensioner gear and a gear connected to a spool are meshed with each other and rotated by the balls being discharged, thereby pretensioning a seat belt.

The present invention provides a seat belt retractor having a structure for preventing the pretensioner from being assembled improperly.

SUMMARY OF THE INVENTION

According to the present invention, a seat belt retractor including a spool for winding up a seat belt and a gear fitted to the spool for driving the spool to wind up the seat belt is provided. The gear has two end faces and is configured so that it only fits onto the spool when one of the end faces is adjacent the spool.

According to an alternative embodiment of the present invention, a seat belt retractor for winding up a seat belt is provided. The retractor includes a spool configured to rotate to wind up the seat belt and a gear configured to interfit with the spool so that when the gear rotates the spool rotates about an axis of rotation to wind up the seat belt. The spool includes an external tooth asymmetrical about any plane passing through the axis of rotation of the spool.

The gear may include a surface that contacts the spool, the surface being asymmetrical about a plane perpendicular to the axis of rotation of the spool. The gear may be configured to surround the spool so that the external tooth of the spool engages an internal surface of the gear. The internal surface of the gear may be asymmetrical about a plane perpendicular to the axis of rotation of the spool. The spool may include a plurality of external teeth, and at least one of the teeth may have different dimensions from another one of the teeth.

According to yet another alternative embodiment of the present invention a retractor for winding up a seat belt is provided. The retractor includes a spool and a gear for driving he spool. The gear includes a surface that contacts the spool, the surface being asymmetrical about a plane perpendicular to the axis of rotation of the spool.

According to the present invention, a seat belt retractor for winding up a seat belt by the rotation of a spool may be characterized by including a gear having external teeth not symmetrical about any plane passing through the axis. The gear may be interfitted with the shaft of the spool and fitting portions between the shaft of the spool and the gear may be configured not to be symmetrical about any plane passing through the axis. Therefore, even by taking an action of fitting the gear to the shaft of the spool wrong side out when assembly, the opening of the gear and the periphery of the spool never be fitted to each other so as not to allow the interfit between the gear and the spool. The mistake assembly can be prevented without special attention.

According to the present invention, a seat belt retractor for winding up a seat belt by the rotation of a spool may be characterized by including a gear having external teeth not symmetrical about any plane passing through the axis. The gear may be interfitted with the shaft of the spool, and fitting portions between the shaft of the spool and the gear may be configured not to be symmetrical relative to a plane at the center between one side facing the spool and the other side of the gear. Therefore, even by taking an action of fitting the gear to the shaft of the spool wrong side out when assembly, the opening of the gear and the periphery of the spool never be fitted to each other so as not to allow the interfit between the gear and the spool. The mistake in assembly can be prevented without special attention.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 1(a1)–(c2) show configuration of a pinion and a spool gear of an embodiment of the present invention.

FIG. 2 is a view showing a sectional configuration of the pinion 20 of another embodiment of the present invention.

FIG. 3 is an exploded perspective view showing an example of a seat belt retractor having the pretensioner.

DETAILED DESCRIPTION

Figure 4A:
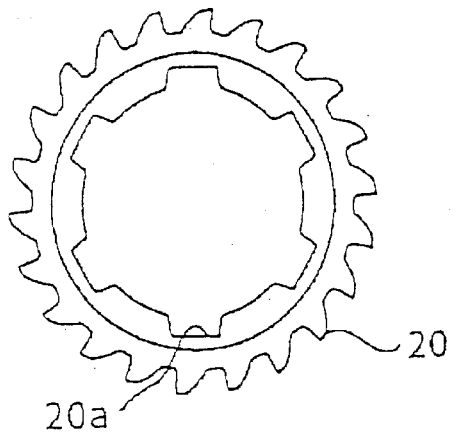
FIGS. 4(a)–(b) shows views of the configurations of conventional examples of a pinion and a spool gear.

Hereinafter, an embodiment of the present invention will be described with reference to attached drawings. FIGS. 1(a1)–(c2) show configuration of a pinion 20 (corresponding to the pinion 20 shown in FIG. 3 and also corresponding to "gear" in the patent claims and a spool gear 19 (corresponding to the spool gear 19 shown in FIG. 3 and also corresponding to "spool shaft" in the patent claims of embodiments of the present invention, in which a gear having external teeth being not symmetrical about any plane passing through the axis is interfitted with the shaft of the spool.

FIG. 3 is an exploded perspective view showing an example of seat belt retractor with a pretensioner. The seat belt retractor includes a base frame 1 and a spool 2 housed in the base frame 1. When the retractor is placed in use a seat belt is wound onto the spool 2. The rotation of the spool 2 causes the winding and unwinding of the seat belt. The spool 2 may have a torsion bar 3 as its shaft, one end of which is supported by a retainer 6 via two locking mechanisms 4, 5. The spool 2 has a gear 7 on one end thereof which is meshed with a gear in a return spring cover 8. The spool 2 is biased in a belt-winding direction by a return spring in the return spring cover 8.

The pretensioner includes a pipe 11 between a pretensioner cover 9 and a pretensioner plate 10. A gas generator 12 is disposed on one end of the pipe 11. Arranged inside the pipe 11 are a stopper spring 13, a piston 14, and a plurality of balls 15. The pipe 11 has a cut-out in a peripheral portion near the other end thereof and a guide block 16 is fitted into the other end of the pipe 11.

The pretensioner cover 9 is provided with two pins 17 by which a ring gear 18 is held. The ring gear 18 is formed with holes into which the pins 17 are inserted. The front-most ball is supported between one of the external teeth of the ring gear 18 and a portion of the inner wall of the pipe 11 facing to the cut-out.

A pinion 20 is arranged to be fitted to the gear 19 of the spool 2. In the normal state, the ring gear 18 and the pinion 20 are not meshed with each other. When gas is produced by the gas generator 12, however, the balls 15 are pushed via the piston 14 by the pressure of gas. The pins 17 are sheared by forces from the balls. As a result, the ring gear 18 is released and moves to be meshed with the pinion 20, as described further below. The balls 15 cause the ring gear 18 to rotate so as to rotate the spool 2 via the pinion 20. Thus, the seat belt is pretensioned.

In the seat belt retractor having the aforementioned structure, the teeth of both the ring gear 18 and the pinion 20 are inclined in the opposite direction of the rotational direction to facilitate the mesh between the internal teeth of the ring gear 18 and the external teeth of the pinion 20. Accordingly, the external teeth of the pinion 20 have no symmetrical properties relative to any plane passing through the axis of the pinion 20 (i.e. the axis of the spool 2), i.e. are not symmetric, as shown in FIGS. 1 and 4.

Figure 4B:
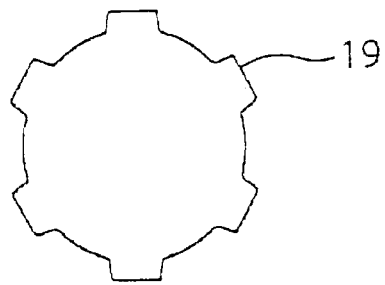

As shown in the embodiment of FIG. 4, the fitting periphery 20a on the inner surface of the pinion 20 and the outer periphery of the spool gear 19 have profiles that are symmetrical relative to a plane passing through the axes of rotation of pinion 20 and the spool 2 (i.e. the fitting periphery 20a and the outer periphery of the spool gear are both symmetric, and the profiles of the fitting periphery 20a and the outer periphery of the spool gear 19 extend parallel to the axis of rotation of the spool). On occasion workers assembling the retractor fail to pay attention to the direction of the pinion 20 when putting the pinion 20 onto the spool gear 19. As a result, they may occasionally put the pinion wrong side out. Thus, the inclination of the external teeth of the pinion is reversed, thereby preventing the pinion 20 from securely meshing with the internal teeth of the ring gear 18.

As shown in FIGS. 1(a1) and 1(a2), the present invention provides for modifying the concave and convex portions of the fitting periphery 20a inside the pinion 20 and the outer periphery of the spool gear 19, respectively, in order to prevent improper assembly of the retractor. As shown in FIGS. 1(a1) and 1(a2) the teeth of the spool gear 19 are inclined in the circumferential direction and thus are not symmetrical about any plane passing through the axis of rotation of the spool. Therefore, if during assembly the pinion 20 is positioned adjacent the spool gear 19 with the wrong side out, the pinion 20 and the spool gear 19 would not fit together and the mistake would be noticed and, therefore, prevented.

In an alternative embodiment of the present invention, shown in FIGS. 1(b1) and 1(b2), the fitting periphery 20a inside the pinion 20 includes a single concave portion 20b and, the outer periphery of the spool gear 19 includes a corresponding convex portion 19a. The concave portion 20b and the convex portion 19a are formed so that lateral sides thereof are not symmetrical about any plane passing through the axis of rotation of the spool. Therefore, if during assembly the pinion 20 is positioned adjacent the spool gear 19 with the wrong side out, the pinion 20 and the spool gear 19 would not fit together and the mistake would be noticed and, therefore, prevented.

In yet another alternative embodiment of the present invention, as shown in FIGS. 1(c1) and 1(c2), the fitting periphery 20a inside the pinion 20 is formed with two concave portions 20c, 20d and the outer periphery of the spool gear 19 is formed with two corresponding fitting convex portions 19b, 19c. There is a differential between the width a of the first concave portion 20c and the first convex portion, and the width b of the second concave portion 20d and the second convex portion 19c. As a result, the pinion 20 and the spool gear 19 are not symmetrical about any plane passing through the axis of rotation of the spool. Therefore, as in the embodiments discussed above, if during assembly the pinion 20 is positioned adjacent the spool gear 19 with the wrong side out, the pinion 20 and the spool gear 19 would not fit together and the mistake would be noticed and, therefore, prevented.

FIG. 2 is a cross-sectional view of the pinion 20 according to another embodiment of the present invention. The interior surface 20a of the pinion 20 (i.e., the fitting periphery) comprises an inclined surface. A line extending across the surface or periphery 20a is not parallel to the axis of rotation of the spool. In addition, the fitting periphery 20a of the pinion 20 is formed such that an end face of the pinion 20 at the spool side (side of the arrow in FIG. 2) is not symmetrical to the other end face of the pinion at the side opposite to the spool about a plane at the center of the pinion perpendicular to the axis of rotation of the spool. The outer periphery of the spool gear 19 is formed corresponding to the configuration of the fitting periphery 20a of the pinion 20. The present invention provides a mechanism for preventing the improper assembly of the retractor, because the pinion 20 only fits onto the spool gear in one way.

As described above, the present invention prevents improper assembly of the retractor without requiring any special attention. The pinion 20 and the spool gear 19 are configured so that these parts fit together in only one arrangement. The pinion gear 20 may not be positioned adjacent the spool gear 19 wrong side out.

The priority document, Japanese Patent Application No. 2000-223999, filed Jul. 25, 2000, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor for winding up a seat belt comprising:
 a spool configured to rotate to wind up the seat belt;
 a gear fitted to the spool so that when the gear rotates the spool rotates about an axis of rotation to wind up the seat belt;
 wherein the gear includes a surface that contacts the spool, the surface being asymmetrical about a plane at the center of the gear perpendicular to the axis of rotation of the spool.

2. A seat belt retractor for winding up a seat belt comprising:

a spool configured to rotate to wind up the seat belt;

a gear configured to interfit with the spool so that when the gear rotates the spool rotates about an axis of rotation to wind up the seat belt;

wherein the spool includes two noncontiguous external teeth wherein the external teeth contact the gear when the gear is interfitted with the spool;

wherein one of the two external teeth has different dimensions than the other one of the two external teeth; and wherein the gear and the spool are configured such that the gear interfits with the spool only at one angular position with respect to the spool, the angular position being defined about the axis of rotation of the spool.

* * * * *